United States Patent
Billard

(10) Patent No.: US 11,632,908 B2
(45) Date of Patent: Apr. 25, 2023

(54) AGRICULTURAL MACHINE PROVIDED WITH A SIMPLIFIED SAFETY SYSTEM ENABLING A TOOL OR GROUP OF TOOLS CONNECTED TO A HITCHING SUPPORT BY A SUPPORT ARM TO CARRY OUT A SAFETY MOVEMENT

(71) Applicant: KUHN S.A., Saverne (FR)

(72) Inventor: Sylvain Billard, Reihardsmunster (FR)

(73) Assignee: KUHN S.A., Saverne (FR)

( * ) Notice: Subject to any disclaimer, the term of this patent is extended or adjusted under 35 U.S.C. 154(b) by 344 days.

(21) Appl. No.: 16/765,396

(22) PCT Filed: Nov. 20, 2018

(86) PCT No.: PCT/EP2018/081910
§ 371 (c)(1),
(2) Date: May 19, 2020

(87) PCT Pub. No.: WO2019/101732
PCT Pub. Date: May 31, 2019

(65) Prior Publication Data
US 2020/0337242 A1 Oct. 29, 2020

(30) Foreign Application Priority Data
Nov. 21, 2017 (FR) .................... 17 60994

(51) Int. Cl.
*A01D 75/18* (2006.01)
*A01D 34/66* (2006.01)
(Continued)

(52) U.S. Cl.
CPC ......... *A01D 75/185* (2013.01); *A01D 34/661* (2013.01); *A01D 34/664* (2013.01); *A01D 67/00* (2013.01); *A01D 2101/00* (2013.01)

(58) Field of Classification Search
CPC .... A01B 59/00–069; A01B 61/00–048; A01B 63/00–32; A01D 34/66;
(Continued)

(56) References Cited

U.S. PATENT DOCUMENTS 3,462,923 A * 8/1969 Yeske .................... A01D 34/03
56/16.3
5,101,616 A 4/1992 Wolff
(Continued)

FOREIGN PATENT DOCUMENTS

DE 202014002808 U1 * 8/2015 .......... A01D 34/661
EP 0 451 074 A1 10/1991
(Continued)

OTHER PUBLICATIONS

International Search Report dated Jan. 10, 2019 in PCT/EP2018/081910 filed Nov. 20, 2018, 2 pages.

*Primary Examiner* — Adam J Behrens
(74) *Attorney, Agent, or Firm* — Oblon, McClelland, Maier & Neustadt, L.L.P.

(57) ABSTRACT

An agricultural machine includes a hitching support, at least one tool or group of tools that can be transferred between an operational position and a raised position, at least one support arm that is connected to the hitching support via two joints and to the tool or group of tools at an assembly location, and a safety device for performing a safety movement under the effect of pressure. At least one first safety movement phase is carried out around the first joint or around one of the two joints. The safety device includes at least one guiding device to allow for a variation in a distance between the other of the two joints and the assembly location when the rearward rotation is carried out around the first joint.

16 Claims, 6 Drawing Sheets

(51) Int. Cl.
*A01D 67/00* (2006.01)
*A01D 101/00* (2006.01)

(58) Field of Classification Search
CPC .. A01D 34/661; A01D 34/664; A01D 34/665; A01D 34/828; A01D 75/18; A01D 75/185; A01D 67/00; A01D 67/005
See application file for complete search history.

(56) References Cited

U.S. PATENT DOCUMENTS

| | | | |
|---|---|---|---|
| 5,566,537 | A | 10/1996 | Kieffer et al. |
| 8,713,904 | B1 * | 5/2014 | Goudy .................. A01D 34/84 56/15.5 |
| 2016/0255762 | A1 | 9/2016 | Billard |

FOREIGN PATENT DOCUMENTS

| | | |
|---|---|---|
| EP | 0 679 327 A1 | 11/1995 |
| EP | 2 614 697 A2 | 7/2013 |
| EP | 2 926 643 A1 | 10/2015 |
| FR | 2 384 431 | 10/1978 |
| NL | 1 033 509 C2 | 9/2008 |
| WO | WO 2015/075356 A1 | 5/2015 |

\* cited by examiner

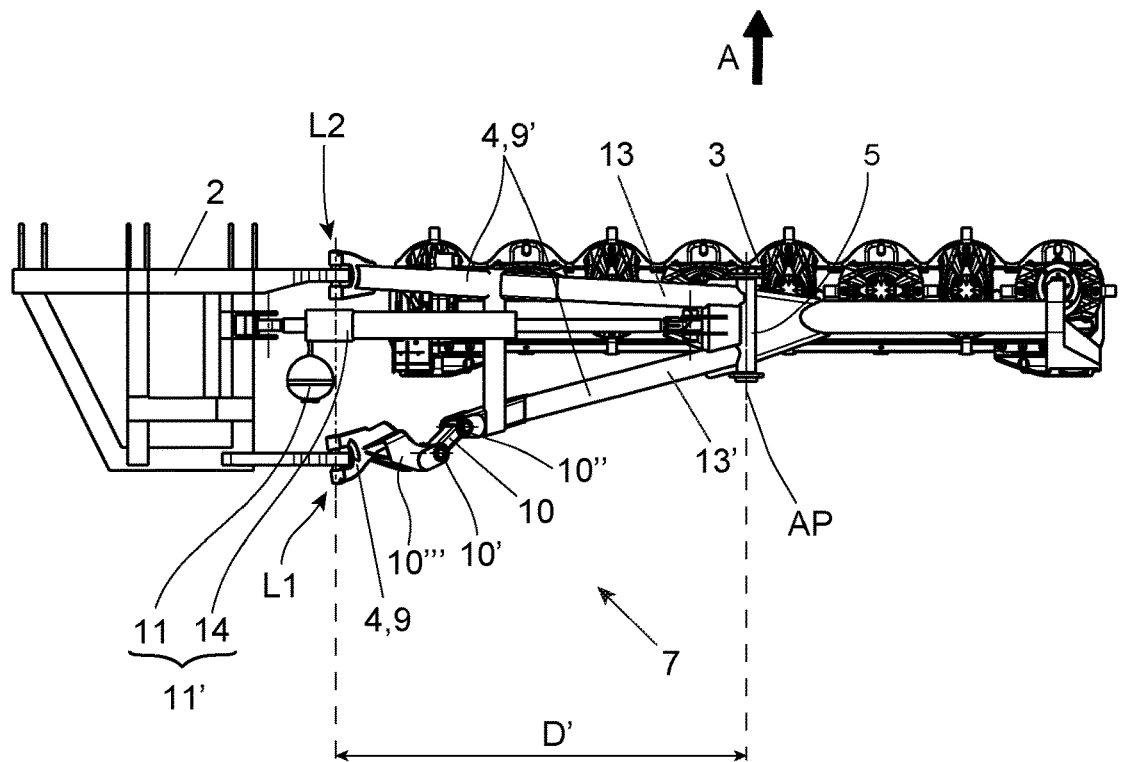

AGRICULTURAL MACHINE PROVIDED WITH A SIMPLIFIED SAFETY SYSTEM ENABLING A TOOL OR GROUP OF TOOLS CONNECTED TO A HITCHING SUPPORT BY A SUPPORT ARM TO CARRY OUT A SAFETY MOVEMENT

BACKGROUND

The present invention relates to the field of mounted, drawn or pushed agricultural machines, particularly of the type that glide resting on the ground in normal use, such as harvesting, mowing or plant-treatment machinery.

The invention relates more specifically to an agricultural machine of the type mentioned hereinabove with a simplified safety system.

Whatever their exact nature, the agricultural machines to which the invention relates all have in common the fact that during work they normally travel in a determined direction of forward travel and that they comprise:
- a hitching support,
- at least one tool or group of tools having, in the work position, an extension transverse to the direction of forward travel and projecting laterally with respect to the hitching support, said tool or group of tools being able to be transferred about a corresponding transfer axis alternately between the work position, in which it bears at least partially on the ground, and at least one raised position, in which it is distant from the ground,
- at least one mounting arm which is connected, on the one hand, to the hitching support, via a first articulation and a second articulation, this second articulation being offset forward, in the direction of forward travel, with respect to the first articulation, at least in the work position and, on the other hand, to the tool or a group of tools considered at an assembly site that is offset toward the opposite end of the arm to the first and second articulations or situated at that end,
- a safety device by means of which the tool or the group of tools considered can perform a safety movement under the effect of sufficient pressure exerted on the tool or the group of tools in an opposite direction to the direction of forward travel, this safety movement comprising at least a first phase of movement of which one component is a rotation toward the rear, this being with respect to the direction of forward travel and with respect to the hitching support.

Specifically, when they are being used, these machines may strike a stone, a stump or a similar obstacle protruding from the ground and firmly set therein. In order to avoid damage to the tool or the group of tools, to the hitching support and/or to the connections between these elements, as a result of a brutal impact, the aforementioned safety device in the known way causes the tool or the group of tools to pivot toward the rear in order to absorb the shock, compensate for the forward travel of the machine with respect to the obstacle, and give said tool or group of tools more time to overcome the obstacle, by passing over it by sliding or after tilting or lifting.

Numerous solutions are already known that allow this function to be achieved.

In these known machines, the aforementioned transfer axis also makes it possible to achieve the transport position and potential intermediate positions such as, for example, a windrowing position in the case of a mower or a swather.

Such agricultural machines are known for example from documents FR 2 384 431, EP 2 926 643 and EP 2 614 697.

A constructional variant of such machines, in which the transfer and backoff axis is a vertical axis (the transport position being obtained by folding toward the rear, parallel to the direction of forward travel), is known from document EP 0 679 327.

In the constructive solutions disclosed in documents FR 2 384 431, EP 2 926 643 and EP 2 614 697, the transfer axis is moved during the rotation toward the rear either because it is attached to an additional part that pivots with respect to the hitching support, or because one of the articulations of said axis is mounted with the ability to move with respect to the hitching support.

However, these solutions are complicated, bulky and expensive because of the additional part required or because of the additional active members (cylinders) that are necessary to render the articulation concerned mobile and hold it in position.

BRIEF SUMMARY

A first object of the present invention is to propose, in the context of the aforementioned machines, a simpler and less bulky solution for achieving the safety movement. An additional objective is to provide a safety movement that is graduated, preferably having at least two consecutive phases.

To that end, the invention proposes, for an agricultural machine considered hereinabove, that the first and second articulations together define the transfer axis, that said at least first phase of safety movement takes place about the first articulation or about the second articulation, and that the safety device comprise at least one guide device able and intended to allow a variation in a first distance between the second articulation and the assembly site when the rearward rotation take place about the first articulation, or a variation in a second distance between the first articulation and the assembly site when the rotation toward the rear takes place about the second articulation.

BRIEF DESCRIPTION OF THE DRAWINGS

The invention will be better understood, through the description which follows, which relates to some preferred embodiments given by way of nonlimiting examples and explained with reference to the attached schematic drawings in which:

FIG. 7 is view from above of an agricultural machine according to a second embodiment of the invention, by way of a constructive variant of the one depicted in FIGS. 1 to 4, this machine being depicted in the normal work position, and taking the form of a disk mower (neither the tractor vehicle nor the cover, cowling, control, drive or other accessory equipment being depicted, for the sake of clarity), and FIG. 8 is a view from above of the machine depicted in FIG. 7, in its configuration during a second phase of the safety movement (mower bar tilted toward the rear and moved away from the ground).

DETAILED DESCRIPTION

Figure 1A:
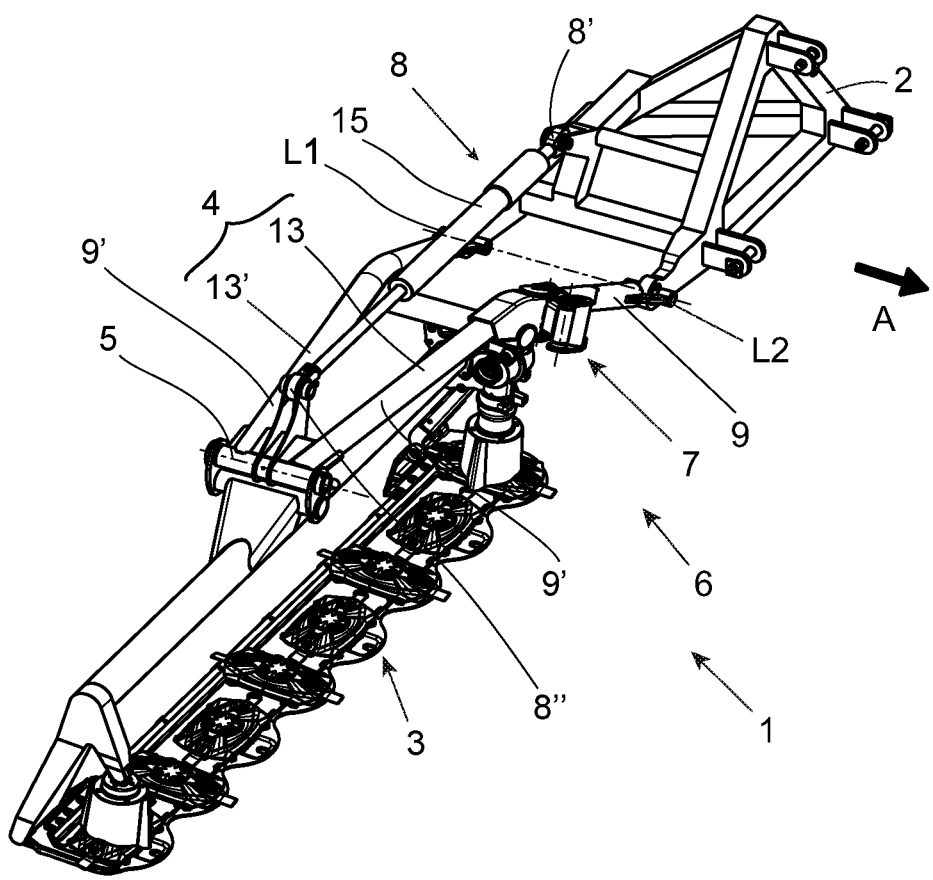
FIGS. 1A to 1D are views, respectively, in perspective (1A), from the front (1B), from the right (1C), and from above (1D), of an agricultural machine according to a first embodiment of the invention, depicted in the normal work position, this machine taking the form of a disk mower (neither the tractor vehicle nor the cover, cowling, control, drive or other accessory equipment being depicted, for the sake of clarity)

FIGS. 1 to 8 illustrate, for some of them only very partially, an agricultural machine 1 of the mounted or drawn type, moving during work normally in a direction of forward travel A, and comprising:

a hitching support 2, at least one tool or group of tools 3 having, in the work position, an extension transverse to the direction of forward travel A and projecting laterally with respect to the hitching support 2, said tool or group of tools 3 being able to be transferred about an axis AT (referred to as transfer axis) alternately between a work position, in which it bears at least partially on the ground S, and at least one raised position, in which it is distant from the ground S, at least one mounting arm 4 which is connected, on the one hand, to the hitching support 2, via a first articulation L1 and a second articulation L2, this second articulation L2 being offset forward, in the direction of forward travel A, with respect to the first articulation L1, at least in the work position and, on the other hand, to the tool or a group of tools 3 considered at an assembly site 5 that is offset toward the opposite end 4' of the arm 4 to the first and second articulations L1 and L2 or situated at that end 4', and a safety device 6 by means of which the tool or the group of tools 3 considered can perform a safety movement under the effect of sufficient pressure P exerted on the tool or the group of tools 3 in an opposite direction to the direction of forward travel A, this safety movement comprising at least a first phase of movement of which at least one component is a rotation toward the rear, this being with respect to the direction of forward travel A and with respect to the hitching support 2.

According to the invention, said at least first phase of safety movement toward the rear takes place about the first articulation L1 or about the second articulation L2, and the safety device 6 comprises at least one guide device 7 able and intended to allow a variation in the first distance D between the second articulation L2 and the assembly site 5 when the rearward rotation takes place about the first articulation L1 (FIGS. 1 to 6), or a variation in the second distance D' between the first articulation L1 and the assembly site 5 when the rotation toward the rear takes place about the second articulation L2 (FIGS. 7 and 8). What is meant in this document by "rotation toward the rear" is the rearward rotation of said at least first phase of the safety movement.

In addition, the transfer axis AT is defined by the mutual collaboration of the first articulation L1 and second articulation L2, which means to say that these two articulations together define said axis AT. It is therefore fixed with respect to the hitching support 2. As a preference, this transfer axis AT is substantially parallel to the ground S when the machine 1 is hitched.

Thus, the invention provides a simple solution to bringing about the rearward safety movement of the tool or group of tools 3, requiring neither an additional component (the mounting arm 4 is assembled directly with the hitching support 2) nor any movement of the transfer axis AT or of one of the articulations L1 or L2 with respect to the hitching support 2. Direct assembly of the mounting arm 4 with the hitching support 2 is advantageously achieved using the first and second articulations L1 and L2.

What is meant herein by direct assembly is a connection without an additional intermediate component or element, outside of the articulations L1 and L2 which achieve said assembly. This then results in a simple and robust construction with a minimum number of constituent parts for the hitching support 2/mounting arm 4 assembly.

According to a preferred construction, the guide device 7 is incorporated into the structure of the mounting arm 4 and is configured to perform, during the rotation toward the rear, either a deployment movement resulting in a lengthening of the first distance D between the second articulation L2 and the assembly site 5, when said rotation takes place about the first articulation L1, or a folding movement resulting in a shortening of the second distance D' between the first articulation L1 and the assembly site 5, when said rotation takes place about the second articulation L2. The first case (variation in D) is illustrated by FIGS. 1 to 6 and the second case (variation in D') is illustrated in FIGS. 7 and 8.

These measures make it possible to result in a constructive solution that has a minimum bulk (the guide device 7 forms an integral part of the arm 4) involving only the mounting arm 4 (the other constituent elements of the machine 1 are not affected in terms of constructive modifications to achieve the rearward movement).

It may be noted that the solution according to the invention can be implemented symmetrically, and indifferently, according to any one of the two aforementioned cases.

Figure 1B:
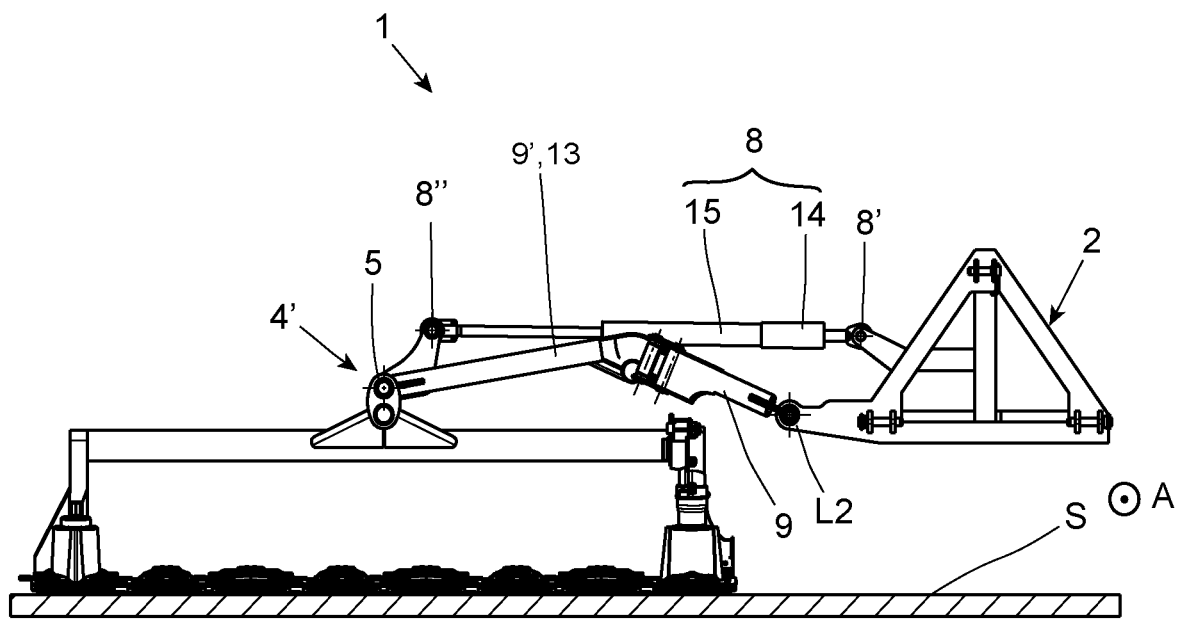
Figure 1C:
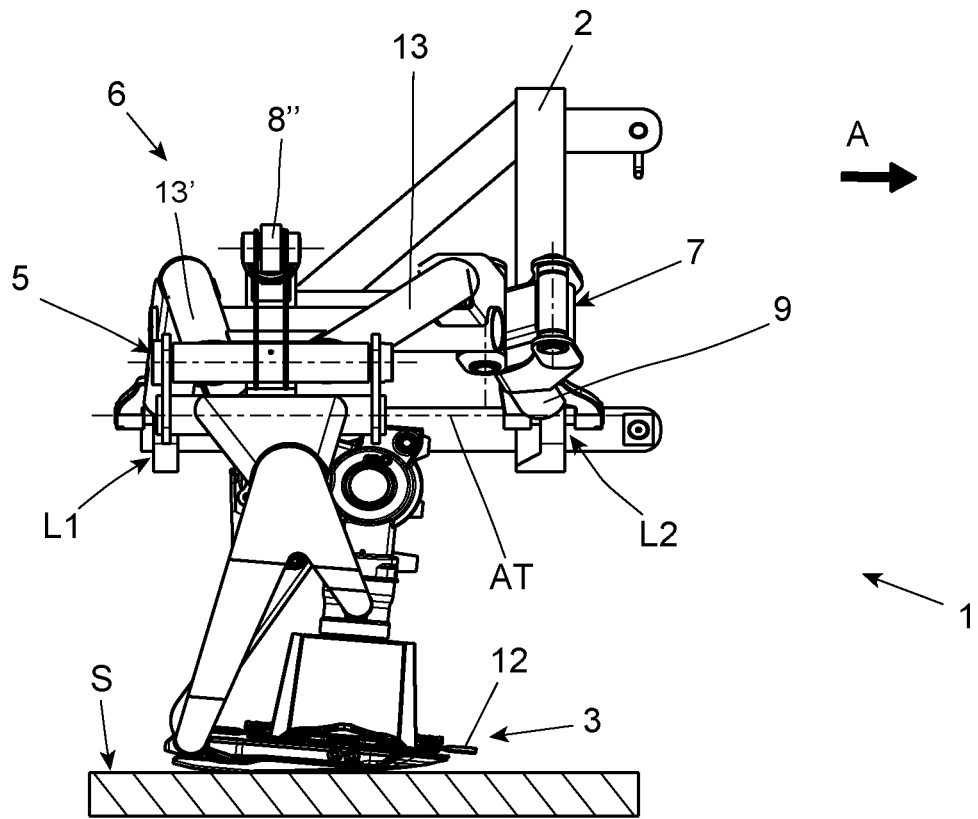
Figure 1D:
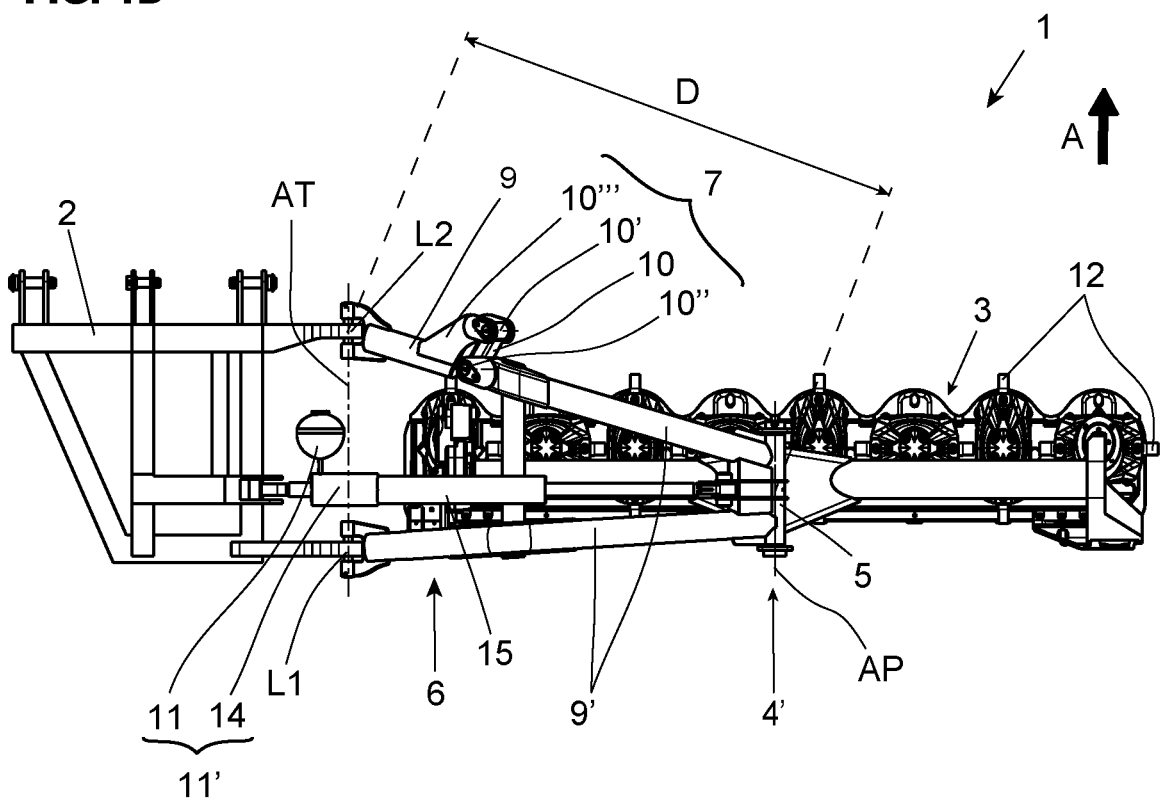
Figure 2A:
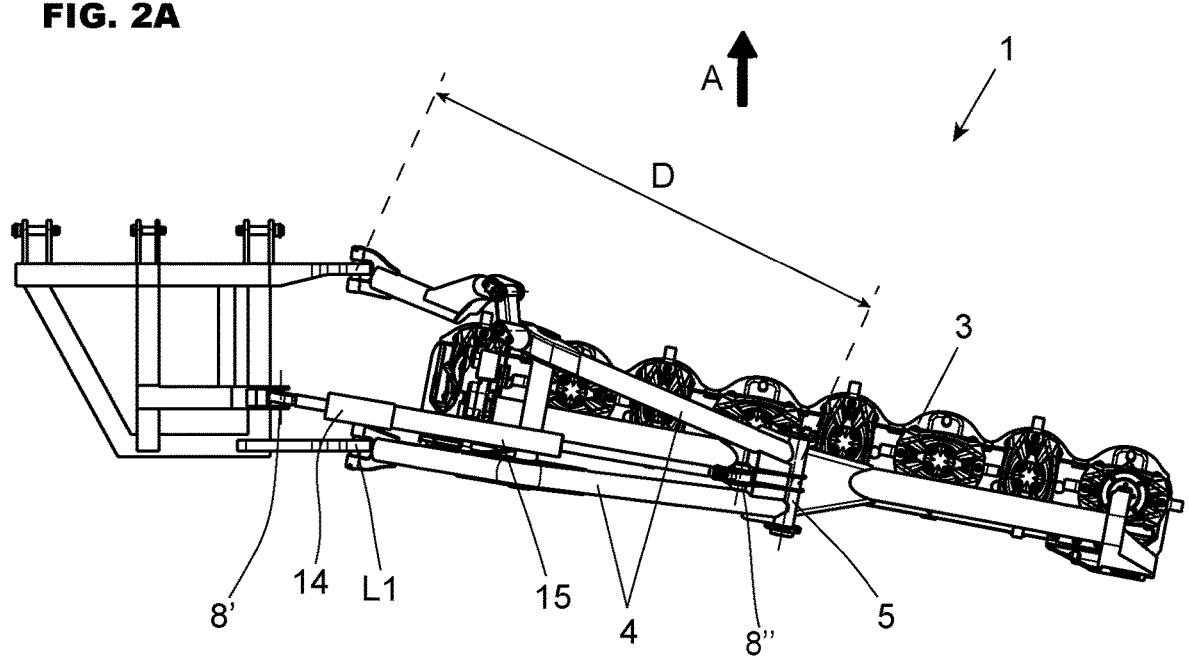
FIGS. 2A and 2B are views, respectively from above (2A) and from the right (2B), of the machine depicted in FIG. 1, in its configuration at the end of the first phase of the safety movement (rearward movement of the mower bar and elimination of the nose-down attitude, by comparison with the configuration of FIG. 1)
Figure 2B:
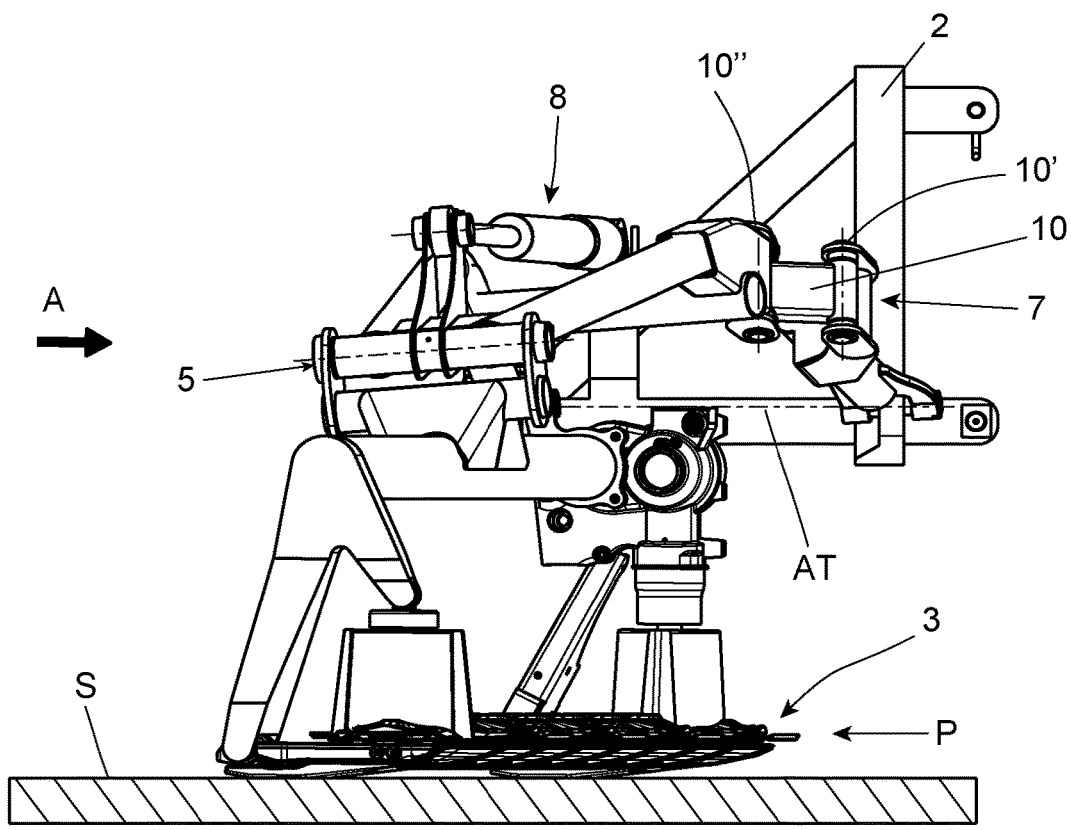

Such is notably the case with mowers of which the tool or group of tools 3 consists of a mowing bar bearing mowing disks or drums fitted with cutting members 12 which make an angle with respect to the ground S, referred to as the nose-down angle, in the normal work position (see FIGS. 1C and 2B).

In this context, the guide device 7 according to the invention is designed to benefit from the rearward rotation of the tool or group of tools 3 about the first articulation L1 or about the second articulation L2 and with respect to the hitching support 2, to force the tool or group of tools 3 to pivot rearward about a horizontal axis transverse to the direction of forward travel A.

The hitching support 2 is intended to be connected to a tractor or similar vehicle, not depicted (for example a three-point hitch).

The assembly site 5 advantageously consists in a third articulation able to transmit, from the tool or group of tools 3, the pressure P to the mounting arm 4, providing a pendular attachment to the tool or group of tools 3 with respect to the mounting arm 4.

In one preferred embodiment, the assembly site 5 may be a pivot connection of axis AP. As may be seen from the attached figures, in the normal work position, the axis AP is preferably substantially parallel to the direction of forward travel A. Furthermore, in this same position, the axis AP is substantially horizontal or parallel to the plane of the ground S. According to a preferred construction, the assembly site 5 connects the arm 4 to the tool or group of tools 3 via a link rod articulated to the arm 4 about an axis AP and articulated to the tool or group of tools 3 about a pivot connection of axis parallel to the axis AP.

The first distance D may then be defined as being the distance between the first articulation L1 and a point on the straight line passing through the axis AT. The second distance D', for its part, may be defined as being the distance between the second articulation L2 and a point on the straight line passing through the axis AT.

The first and second articulations L1 and L2 for their part are configured, by having sufficient degrees of freedom, to allow the various movements of the arm 4 and are of a type able to permit, on the one hand, at least a limited rotation about an axis substantially parallel to the plane of the ground S and substantially parallel to the direction of forward travel A and, on the other hand, at least a limited rotation about an axis substantially perpendicular to the plane of the ground S.

As a preference, each of the first and second articulations L1 and L2 is a ball jointed articulation.

Advantageously, the guide device 7 is incorporated into the mounting arm 4 and configured to allow said mounting arm 4 a limited change in shape.

Thus, the guided deformation of the guide device 7 brought about by the rearward rotation of the tool or group of tools 3, generated by the pressure P of an obstacle and transmitted to the mounting arm 4 by the articulation 5, leads to a deformation of said arm 4. This forced and directed deformation advantageously comprises, given the particular design and arrangement of said guide device 7, which are described by way of example hereinafter and illustrated in the attached figures in several nonlimiting variants, not only a change to one of the first and second distances D and D' but also a modification in the form of a torsion with angular rotation about the axes defining these two distances (axis L1-5 or axis L2-5).

The safety device 6 is able to hold the guide device 7 (and therefore the tool or group of tools 3) in the normal work position.

In the normal work position, no obstacle (likely to be encountered during forward travel of the machine 1) is exerting sufficient pressure P on the mounting arm 4 or the tool or group of tools 3: the safety movement is therefore not performed.

However, in the presence of an obstacle capable of exerting sufficient pressure P, the safety device 6 allows the tool or group of tools 3 a safety movement which can be broken down into at least two consecutive phases.

The first phase then comprises a component of rotation with respect to the hitching support 2 toward the rear about the first articulation L1 or the second articulation. The first phase comprises at least a pivoting about a vertical axis passing through the first articulation L1 or through the second articulation L2. As a preference, this first phase also comprises a pivoting about a horizontal axis or axis parallel to the ground S and transverse to the direction of forward travel A passing through the first articulation L1 or through the second articulation L2. Finally, under certain particular circumstances, the first phase of the safety movement may also comprise a component of pivoting upward about the transfer axis AT.

The second phase of the safety movement authorized by the device 6 of the tool or group of tools 3 comprises at least a component of rotation about a vertical axis passing through the first articulation L1 or through the second articulation L2. As a preference, the second phase of the safety movement of the tool or group of tools 3 comprises an additional component of pivoting about an axis passing through the first articulation L1 or through the second articulation L2.

By providing a safety device 6 with a guide device 7 as mentioned hereinabove, the mounting arm 4 has a limited ability to change shape, allowing the two phases of the safety movement without comprising the main functions of said arm 4, namely those supporting the tool or group of tools 3, maintaining it/them in position and moving it/them between the various operational positions illustrated.

According to one advantageous practical construction also visible in the attached figures, the guide device 7 is mounted between and connects to one another a rigid first constituent part 9 of the mounting arm 4, which is connected to the hitching support 2 by one of the first and second articulations L1 or L2, and a second rigid constituent part 9' thereof, which is connected to the hitching support 2 by the other of the first and second articulations L1 or L2 and comprising the assembly site 5.

The first and second constituent parts 9 and 9' each form a structural component, made as one piece or assembled, which is substantially non-deformable (with the exception of deformations under stress) and therefore rigid.

Such a guide device 7 has the advantage not only of allowing a variation in at least one of the distances D or D', but also of allowing the first constituent part 9 a movement relative to the second constituent part 9'.

According to one embodiment of the invention which is apparent from FIGS. 1 to 8, the guide device 7 advantageously comprises a link 10 connected to each of the two constituent parts 9 and 9' of the mounting arm 4. Each constituent part 9 and 9' is connected to the link 10 by a respective pivot connection 10', 10", the axes of these two pivot connections being mutually parallel. As a preference, the guide device 7 consists in a mechanism known as a scissors-stay or toggle joint mechanism. The link 10 may be connected directly or indirectly to each of the constituent parts 9 and 9'.

In order to force the front of the tool or group of tools 3 to pivot upward and rearward, provision is advantageously made for the parallel axes of the two pivot connections 10' and 10" to be, when the tool or group of tools 3 is/are in the work position, inclined with respect to the vertical to the ground S, in the direction of the hitching support 2.

Advantageously, the angle of inclination with respect to the vertical of the axes of pivoting of the connections 10', 10" is comprised between 10° and 40°, and preferably between 20° and 30° approximately.

The design of the guide device 7 as mentioned hereinabove, namely with a link 10, allows the safety movement to be guided using an articulated quadrilateral 2, 9, 10, 9' integrated into the mounting arm 4. In the figures depicted, this deformable quadrilateral is made up respectively of the hitching support 2, the first constituent part 9, the link 10 and the second constituent part 9'. Thus, this quadrilateral is advantageously situated in the plane containing the articulations L1, L2 and the assembly site 5 and guides rotation about L1 or L2 during the first phase of the safety movement. During this rotation, neither the hitching support 2 nor any one of said articulations L1, L2 moves.

In addition, the aforementioned guide device 7 offers the advantage of being able to guide the tool or group of tools 3 during a second safety movement, this being when the tool or group of tools 3 is in the transport position. This second safety movement is also directed toward the rear with respect to the direction of forward travel A and with respect to the hitching support 2 and takes place about the first articulation L1 or the second articulation L2.

It may be noted that the guide device 7 comprises, in addition to the link 10 doubly articulated in pivoting, a second branch 10''' rigidly attached to one of the constituent parts 9, 9' of the mounting arm 4. Moreover, as is evident from the figures, the axes of the pivot connections 10' and 10'' are oriented perpendicular to the axis AT.

The safety device 6 of the machine 1 may further comprise a specific (dedicated) or non-specific cylinder 14, supplying a resistive force, of predetermined intensity, opposing the rearward rotation of the mounting arm 4 and of the tool or group of tools 3. The cylinder 14 may thus also oppose relative movement of the constituent parts 9 and 9'. In the normal position of the guide device 7 (normal work position of the tool or group of tools 3), the cylinder 14 thus exerts a force keeping the first distance D at its minimum value and/or the second distance D' at its maximum value.

As a preference, this cylinder 14 is connected to a pressure accumulator, such as a hydraulic or oleo pneumatic accumulator 11, so that together they form an energy accumulator 11'. The energy accumulator 11' may, however, also be embodied by a spring.

Said cylinder 14 or energy accumulator 11' that supplies a resistive force, of predetermined intensity, opposing the rearward rotation of the mounting arm 4 and of the tool or group of tools 3, may be a component specifically dedicated to this function or else be formed by an existing component, to which an additional function has been conferred, because of a particular arrangement and/or a particular makeup (see by way of example the description hereinafter relating to the lifting means 8 and FIGS. 1 to 4, 7 and 8).

As a particular preference, the mounting arm 4 has a substantially A-shaped tubular structure with a front branch 13 and a rear branch 13' which are rigidly connected to one another, the free ends of said branches 13 and 13' being connected to the hitching support 2 by the first and second articulations L1 and L2 respectively, and said branches 13 and 13' being assembled at the vertex of the A, which advantageously comprises the assembly site 5.

The crossmember 13" or the like connecting the two branches 13, 13' is connected to the branch 13, 13' comprising the device 7, at its part connected to the vertex of the A and not at its part connected to the hitching support 2.

This shape of mounting arm 4 offers the advantage of holding the tool or group of tools 3 firmly and stably while allowing the rearward rotation of the safety movement.

More specifically, the A-frame structure is advantageously at least slightly asymmetric with a rear branch 13' substantially perpendicular to the transfer axis AT and a front branch 13 inclined rearward with respect to this axis. In this way, the axes of these branches 13 and 13' form with the transfer axis AT a more or less right triangle (projection into a plane containing the articulations L1, L2 and 5).

The guide device 7 is then integrated into one of the two branches 13 and 13' of the mounting arm 4, as shown by the attached FIGS. 1 and 8.

According to one possible feature of the invention more particularly apparent from FIGS. 1A to 1C, D, 2C, 2D, 3A, 4A, 4B and 5B, the guide device 7 is integrated into a portion of one of the branches 13 or 13' which is inclined with respect to a plane defined by the two free ends and the vertex of the A-shaped structure formed by the mounting arm 4. In that way, the safety movement may comprise a rearward pivoting of the front of the tool or group of tools 3, forcing this part to move away from the ground S (for example eliminating a nose-down attitude) and thus advantageously facilitating the passing over an obstacle while at the same time minimizing potential damage caused by this obstacle.

To this end, the mounting arm 4 may advantageously have a curved shape, each branch 13, 13' being made up of two contiguous portions making an obtuse angle between them.

In order to keep the first distance D at its minimum elongation or the second distance D' at its maximum elongation, notably when the tool or group of tools 3 is in the windrowing position, a second energy accumulator 16 connected, on the one hand, to the first constituent part 9, preferably directly, and connected on the other hand to the second constituent part 9', preferably directly, may advantageously be provided so that an attraction can be applied between these two constituent parts 9, 9'. As a preference, the second energy accumulator is a tension spring.

As alternative variant or in addition, provision may also be made for a tension spring 16 to connect the first and second constituent parts 9 and 9' of the mounting arm 4, thus providing elastic loading opposing a mutual separation of said parts 9 and 9' and a deployment of the guide device 7.

Figure 3A:
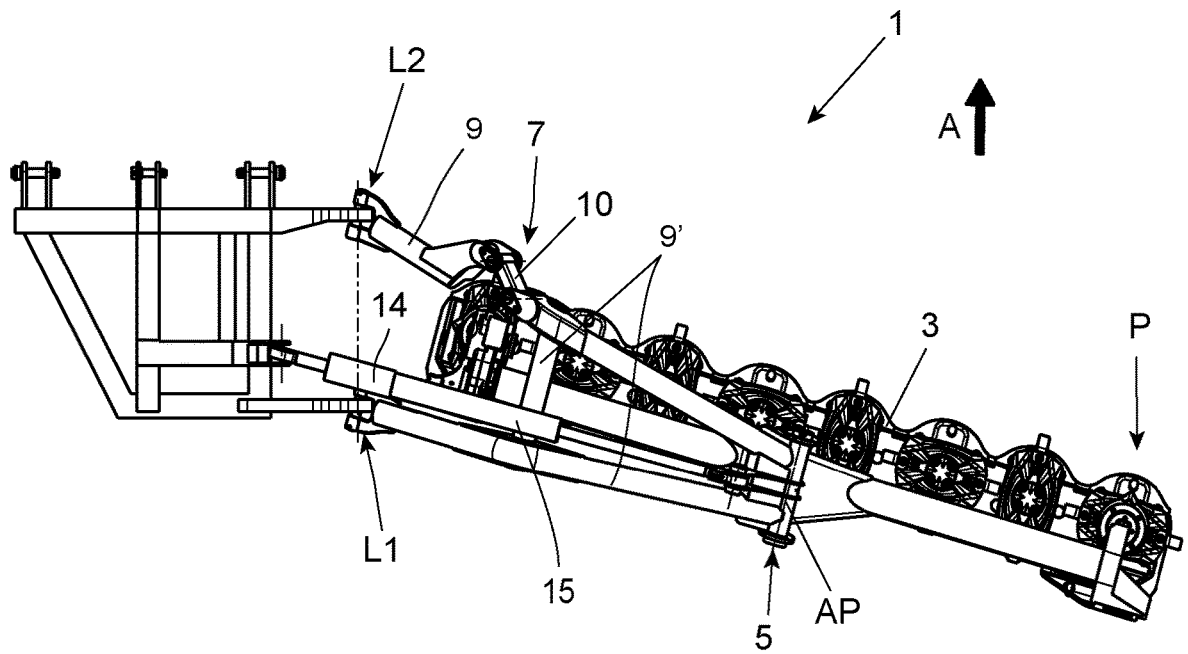
FIGS. 3A and 3B are views, respectively from above (3A) and from the right (3B), of the machine depicted in FIGS. 1 and 2, in its configuration during a second phase of the safety movement (mower bar pivoted toward the rear and moved away from the ground)
Figure 3B:
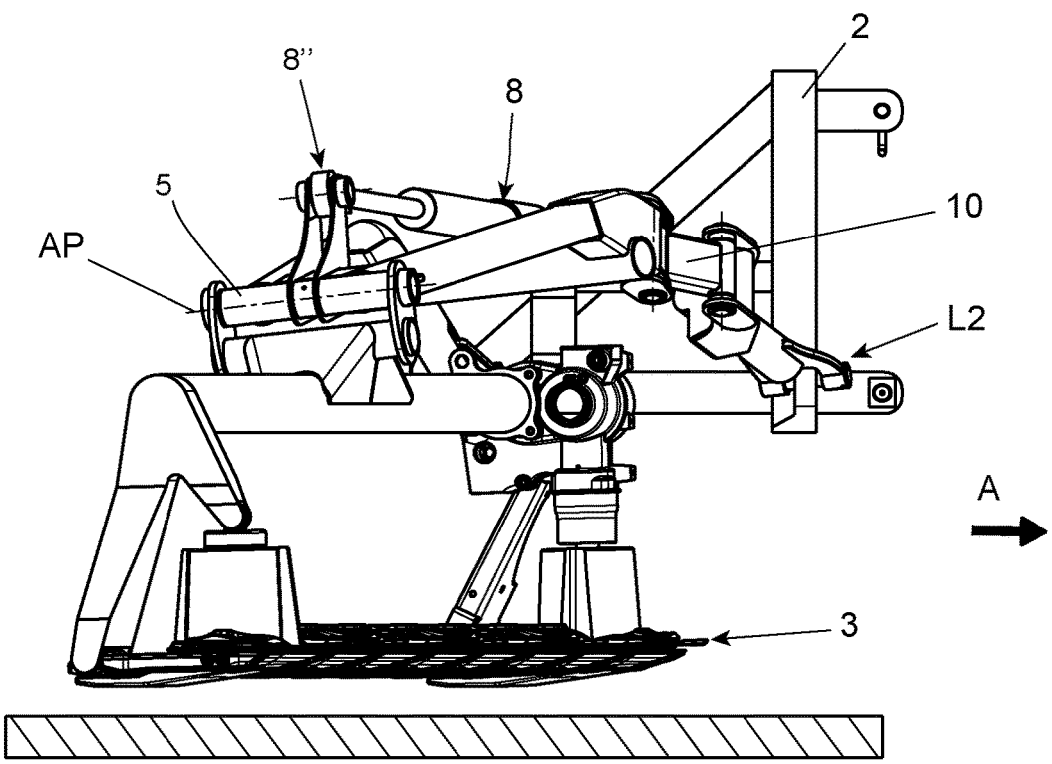
Figure 4:
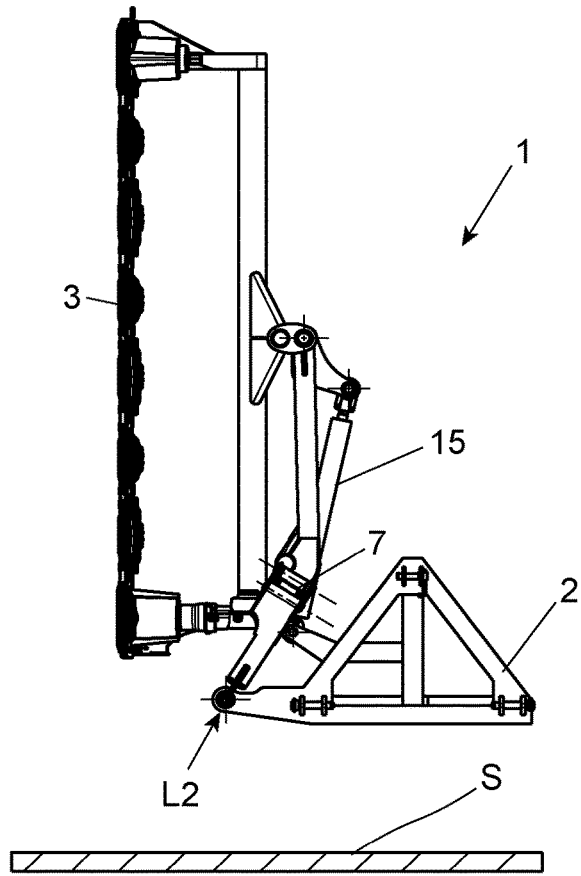
FIG. 4 is a view from the front of the machine depicted in FIGS. 1 to 3, in its transport position (mower bar raised, away from the ground and closer to the hitching support)
Figure 5:
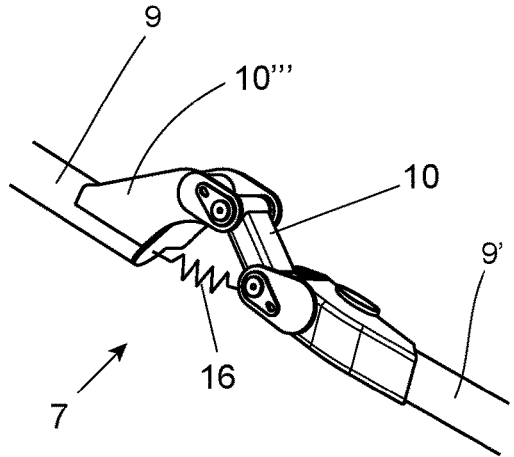
FIG. 5 is a detailed and perspective schematic depiction of a constructive example of a guide device forming part of an agricultural machine according to the first embodiment of the invention.

FIGS. 1 to 6 illustrate a first embodiment in which the guide device 7 is integrated into the front branch 13 of the mounting arm 4. In the normal work position (FIG. 1), this guide device 7 is in the folded configuration and unfolds during the rearward safety movement (FIGS. 2 and 3). In this first embodiment, at least the first phase of the safety movement takes place about the first articulation L1. In this embodiment, when the tool or group of tools 3 is/are in the work position, the distance D varies between, on the one hand, a minimum value corresponding to the normal work position of the tool or group of tools 3 (absence of sufficient pressure P) and, on the other hand, a maximum value reached during the second phase of the safety movement.

FIGS. 7 and 8 illustrate a second embodiment in which the guide device 7 is incorporated into the rear branch 13' of the mounting arm 4. In the normal work position (FIG. 7) this guide device 7 is in the unfolded configuration and it folds backward during the safety movement (FIG. 8). In this second embodiment, at least the safety movement first phase takes place about the second articulation element L2. In this embodiment, when the tool or set of tools 3 is in the work position, the distance D' varies between, on the one hand, a maximum value corresponding to the normal work position of the tool or group of tools 3 (absence of sufficient pressure P) and, on the other hand, a minimum value achieved during the second phase of the safety movement.

When the obstacle cannot be passed or overcome in the scope of the rearward safety movement (first phase), it may, in the known way, be envisioned for the tool or the group of tools 3 to be raised a distance off the ground S in order to pass over the top of the obstacle.

Thus, according to an additional feature of the invention evident from FIGS. 1 to 4 and FIG. 6, the safety device 6 may also comprise a lifting means 8 designed and arranged to exert an upwardly directed force (with respect to the plane of the ground) and allowing the tool or group of tools 3 to be moved automatically and progressively away from the ground S in a second phase of the safety movement consecutive to the end of the first phase, if sufficient pressure P persists (FIGS. 3 and 8). As already indicated hereinabove, what is meant by sufficient pressure P is that the pressure P exceeds a threshold value. This pressure P may be exerted by an obstacle on the tool or group of tools 3 or on the mounting arm 4, when one of these strikes this obstacle during forward travel of the machine 1.

Advantageously, the lifting means 8 consists in a tie connected, on the one hand, to the hitching support 2 at a first connecting point 8', preferably an articulation, situated above and forward of the first articulation L1, and to the rear of the second articulation L2 and, on the other hand, to the mounting arm 4 at a second connecting point 8", preferably an articulation, situated between the first and second articulations L1 and L2 and the assembly site 5, preferably closer to the latter.

Figure 6:
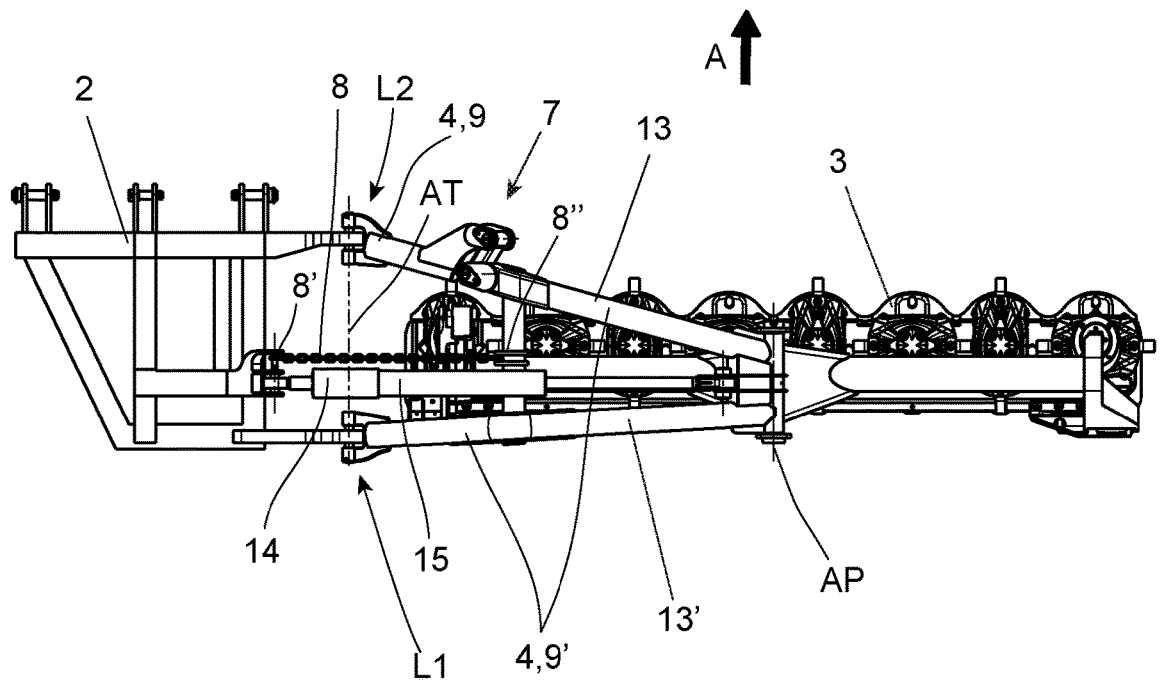
FIG. 6 is a view from above of an agricultural machine according to another (third) embodiment of the invention, depicted in the normal work position, this machine taking the form of a disk mower (neither the tractor vehicle nor the cover, cowling, control, drive or other accessory equipment being depicted, for the sake of clarity)

According to a third embodiment depicted in FIG. 6, the lifting means 8 may be a tie such as a cable, a chain or a similar connecting means that is loose, relaxed or inactive in the normal work position and during the first phase of the safety movement and that is able to transmit a pulling force between the support arm 4 and the hitching support 2 right from the start of the second phase of said movement, during which it becomes taut and active and seeks to move the tool or group of tools 3 away from the ground S.

Provision may also be made for a lifting means 8 to be associated with an additional cylinder, for example the cylinder 14 or the energy accumulator 11', mounted in parallel, and possibly double-acting, said cylinder providing at least a resistive force with respect to the rearward rotation of the mounting arm 4 and of the tool or group of tools 3 during the first phase of the safety movement and possibly being able to move said tool or group of tools 3 toward at least one position away from the ground.

According to one of the first or second embodiments, the lifting means 8 comprises or even corresponds to this cylinder 14 or to the energy accumulator 11' and has an elongation end-stop state, preferably at the end of its travel (FIGS. 1 to 4, 7 and 8).

During the design of the machine 1, the construction of the mounting arm 4 and the choice of the lifting means 8, and the regulating of the stroke thereof (end of travel=end-stop state) or length thereof determine the circumstances that define the start of the second phase of the safety movement. In practice, the inventors have found that an angle of inclination (pivoting about the articulation L1) of approximately 5° to 20° (for example of 10°) toward the rear with respect to a plane perpendicular to the direction of forward travel A, or to its normal work position, of the tool or of the group of tools 3 was a good compromise for choosing the end of the first phase and the start of the second phase of the safety movement.

In the scope of these first and second embodiments, the cylinder 14 or the energy accumulator 11' may also be used for lightening and/or for windrowing, particularly when the tool or group of tools 3 is a mowing means, for example a mowing bar with rotary disks or drums. In this case, the connecting points 8' and 8" are preferably ball jointed articulations, or at the very least a ball jointed articulation 8' and a pivot articulation 8".

Finally, the cylinder 14 or the energy accumulator 11' may be associated coaxially and secured to a lifting cylinder 15 to form the lifting means 8. The lifting cylinder 15 allows the tool or group of tools 3 to be transferred between a transport position (FIG. 4) and the work position, and vice versa. In the transport position, the tool or group of tools 3, for example a mowing bar, is raised, away from the ground and closer to the hitching support 2.

Various embodiment variants of the lifting means 8, in the context of an agricultural machine 1 of the type mentioned herein, are described more specifically in the French patent application filed this day in the name of the applicant company and relating to an agricultural machine with a safety system having improved trip mechanism and the content of which is incorporated herein by reference, particularly as regards the embodiment variants of the means 8.

As a preference, the tool or group of tools 3 is a mowing means, for example a mowing bar with rotary disks or drums fitted with cutting members 12.

Of course, the invention is not restricted to the embodiments described and depicted in the attached drawings. Modifications remain possible, notably from the viewpoint of the makeup of the various elements or through the substitution of technical equivalents without thereby departing from the field of protection of the invention.

The invention claimed is:

1. An agricultural machine, moving during work in a direction of forward travel along a ground, and comprising:
   a hitching support;
   at least one tool or group of tools having, in a work position, an extension transverse to the direction of forward travel and projecting laterally with respect to the hitching support, the tool or group of tools being configured to be transferred about a transfer axis alternately between the work position, in which the tool or group of tools rests at least partially on the ground, and at least one raised position, in which the tool or group of tools is distant from the ground;
   at least one mounting arm which is connected to the hitching support via a first articulation and a second articulation, the second articulation being offset forward, in the direction of forward travel, with respect to the first articulation, at least in the work position, the at least one mounting arm being connected to the tool or group of tools at an assembly site that is offset toward an opposite end of the at least one mounting arm to the first and second articulations; and
   a safety device by which the tool or the group of tools is configured to perform a safety movement under the effect of sufficient pressure exerted on the tool or the group of tools in an opposite direction to the direction of forward travel, the safety movement comprising at least a first phase of movement of which one component is a rearward rotation with respect to the direction of forward travel and with respect to the hitching support,
   wherein the first and second articulations together define the transfer axis, and
   wherein the safety device comprises at least one guide device incorporated into the at least one mounting arm that is configured to allow a variation of a first distance between the second articulation and the assembly site when the rearward rotation takes place, or a variation of a second distance between the first articulation and the assembly site when the rearward rotation takes place.

2. The machine as claimed in claim 1, wherein the at least one mounting arm is assembled directly with the hitching support via the first and second articulations.

3. The machine as claimed in claim 1, wherein each of the first and second articulations is configured to allow at least a limited rotation about an axis substantially parallel to the plane of the ground and substantially parallel to the direction of forward travel and, at least a limited rotation about an axis substantially perpendicular to the plane of the ground.

4. The machine as claimed in claim 1, wherein the guide device is configured to allow the at least one mounting arm a limited change in shape.

5. The machine as claimed in claim 1, wherein the guide device is incorporated into the structure of the at least one mounting arm and is configured to perform, during the rearward rotation, either a deployment movement resulting in a lengthening of the first distance between the second articulation and the assembly site, when the rotation takes place about the first articulation, or a folding movement resulting in a shortening of the second distance between the first articulation and the assembly site, when the rotation takes place about the second articulation.

6. The machine as claimed in claim 5, wherein the guide device is configured to perform, under the effect of the pressure of an obstacle, a forced and directed deformation of the at least one mounting arm comprising a change to one of the first and second distances and a change in the form of a torsion with angular rotation about the axes defining these two distances.

7. The machine as claimed in claim 1, wherein the guide device is mounted between and connects to one another a rigid first constituent part of the at least one mounting arm, which is connected to the hitching support by one of the first and second articulations, and a second rigid constituent part thereof, which is connected to the hitching support by the other of the first and second articulations and comprising the assembly site.

8. The machine as claimed in claim 1, wherein the guide device comprises a link connected to each of the two constituent parts of the at least one mounting arm by a respective pivot connection, the axes of these two pivot connections being mutually parallel.

9. The machine as claimed in claim 8, wherein the parallel axes of the two pivot connections are, when the tool or group of tools is/are in the work position, inclined with respect to be vertical to the ground, in the direction of the hitching support.

10. The machine as claimed in claim 9, wherein the angle of inclination with respect to the vertical of the axes of pivoting of the connections is between 10° and 40°.

11. The machine as claimed in claim 1, wherein the at least one mounting arm has an A-shaped tubular structure with a front branch and a rear branch which are rigidly connected to one another, the free ends of the branches being connected to the hitching support by the first and second articulations respectively, and the branches being assembled at the vertex of the A, which comprises the assembly site, and the guide device is integrated into one of the two branches of the mounting arm.

12. The machine as claimed in claim 1, further comprising a cylinder supplying a resistive force, of predetermined intensity, opposing the rearward rotation of the at least one mounting arm and of the tool or group of tools.

13. The machine as claimed in claim 1, wherein the safety device further comprises a lifting means configured to exert an upwardly directed force allowing the tool or the group of tools to be moved automatically and progressively away from the ground in a second phase of the safety movement that is consecutive to the end of the first phase, when sufficient pressure persists.

14. The machine as claimed in claim 1, wherein the tool or group of tools is a mower.

15. The machine as claimed in claim 1, wherein the tool or group of tools is a mowing bar with rotary disks or drums fitted with cutting members.

16. The machine as claimed in claim 1, wherein each of the first and second articulations and is a ball-jointed articulation.

\* \* \* \* \*